United States Patent
Maughan

(10) Patent No.: US 6,505,990 B1
(45) Date of Patent: Jan. 14, 2003

(54) BEARING SOCKET LINER FOR BALL JOINT

(75) Inventor: Garth B. Maughan, Delta, OH (US)

(73) Assignee: Dana Corporation, Toledo, OH (US)

(*) Notice: Subject to any disclaimer, the term of this patent is extended or adjusted under 35 U.S.C. 154(b) by 8 days.

(21) Appl. No.: 09/887,851

(22) Filed: Jun. 22, 2001

(51) Int. Cl.[7] ................................................ F16C 11/06
(52) U.S. Cl. ...................... 403/135; 403/39; 280/93.511
(58) Field of Search ..................... 403/39, 132, 133, 403/135, 140, 144; 384/218; 280/93.511

(56) References Cited

U.S. PATENT DOCUMENTS

| | | | |
|---|---|---|---|
| 3,452,415 A | | 7/1969 | Beazley et al. |
| 3,848,272 A | | 11/1974 | Noiles |
| 4,116,500 A | | 9/1978 | Huber |
| 4,137,618 A | | 2/1979 | Krauss |
| 4,386,869 A | | 6/1983 | Smith |
| 4,430,016 A | * | 2/1984 | Matsuoka et al. ............ 403/40 |
| 4,676,798 A | * | 6/1987 | Noiles .......................... 623/22 |
| 4,904,106 A | | 2/1990 | Love |
| 5,230,580 A | * | 7/1993 | Henkel ....................... 403/135 |
| 5,297,445 A | | 3/1994 | Chen |
| 5,380,114 A | | 1/1995 | Urbach |
| 5,564,853 A | | 10/1996 | Maughan |
| 5,704,727 A | * | 1/1998 | Atkins et al. ............... 403/135 |
| 5,904,436 A | | 5/1999 | Maughan et al. |
| 6,164,829 A | * | 12/2000 | Wenzel et al. .............. 384/203 |
| 6,164,861 A | * | 12/2000 | Maughan ..................... 403/135 |

* cited by examiner

Primary Examiner—Robert J. Sandy
(74) Attorney, Agent, or Firm—Rader, Fishman & Grauer PLLC

(57) ABSTRACT

An improved socket liner for a ball and socket joint is adapted to be fixedly installed within a joint housing so as to encase the ball. The housing defines a longitudinal axis, and the liner, formed in two longitudinally extending mating halves that confront one another along surfaces parallel to the axis of the housing, are oriented to provide a theoretically tightest possible ball bearing-socket fit. Each liner half includes at least one protuberance on each longitudinally confronting surface. The protuberances not only facilitate location of the liner halves during assembly, but also assure a physical separation between the halves, creating an additional lubrication groove for enhanced operation of the joint during its useful life. In one preferred form, a compliant thin soft material cover is overmolded over the exterior socket liner structure, and exterior surface slots integrally provided on the cover interlock with protruding ribs fixed to the interior of the housing.

10 Claims, 3 Drawing Sheets

BEARING SOCKET LINER FOR BALL JOINT

BACKGROUND OF THE INVENTION

1. Field of Invention

The present invention relates to ball joints of the type used in suspension systems of vehicles, and particularly to new side-to-side bearing socket liner halves that facilitate assembly of aftermarket suspension ball joints, and enhances ball and socket lubrication over the useful life of the joint.

2. Description of the Prior Art

Those skilled in the art will appreciate the typical construction and longevity issues related to original equipment ball joints employed in suspension and steering systems of vehicles. Such issues involve the use of techniques contributing to ease of assembly of ball joint assemblies. For example, several methods are used for securing the ball within a socket liner, assuring proper balance between torque and tightness of the joint. In applications involving oscillation, the ball and stud are permitted to rotate. If the joint is too tight, the housing and lower isn't the socket bearing liner can be prone to cracks and or fracture, which can in turn lead to premature failure of the ball joint assembly. Usually a failure of a ball joint involves not only replacement of the ball joint; typical requirements call for the associated mating boss part to be replaced as well. Thus premature replacement of ball joint assemblies can be relatively expensive.

In suspension applications, the noted issues become potentially exacerbated by potential admission of dirt and moisture into the ball and socket to interface of the joint. Indeed, admission of dust into an exposed ball joint assembly, in combination with entrainment water vapor can be particularly deleterious to a ball joint assembly, and can lead to premature failure, particularly where ball joints are subject to relatively vigorous suspension loads, more particularly associated with off-road vehicles, such as light trucks and sports utility vehicles. Moreover, such premature deterioration of the ball joint assembly may be aggravated if the joint is subject to more than normal amounts of twisting or rotational movements about the longitudinal axis of stud.

SUMMARY OF THE INVENTION

The present invention provides an improved ball socket liner adapted to accommodate a ball and socket joint used in vehicular suspension applications subject to high structural loads, of the type encountered in off-road motoring and commonly associated with today's 4×4 light trucks and sports utility vehicles. More specifically, the improved ball and socket liner is particularly suitable for upper or lower suspension ball joint assemblies of the type used in tie rod ends adapted to oscillate, as well as articulate within limited angular ranges.

In one described embodiment, the improved socket liner for a ball and socket joint is adapted to be fixedly installed within a joint housing so as to encase the ball. The housing defines a longitudinal axis, and the liner, formed in two longitudinally extending mating halves that confront one another along surfaces parallel to the axis of the housing, are oriented to provide a theoretically tightest possible ball bearing-socket fit. Each liner half includes at least one protuberance on each longitudinally confronting surface. The protuberances not only facilitate location of the liner halves during assembly, but also assure a physical separation between the halves, creating an additional lubrication groove for enhanced operation of the joint during its useful life. In one preferred form, a compliant thin soft material cover is overmolded over the exterior socket liner structure, and exterior surface slots integrally provided on the cover interlock with protruding ribs fixed to the interior of the housing.

DETAILED DESCRIPTION OF THE EMBODIMENTS

Figure 2:
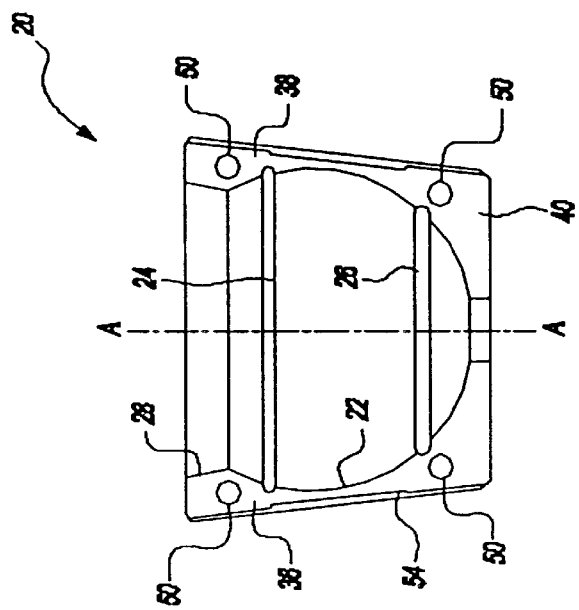
FIG. 2 is a view of the socket bearing liner, shown separately and apart from the ball joint assembly.
Figure 1:
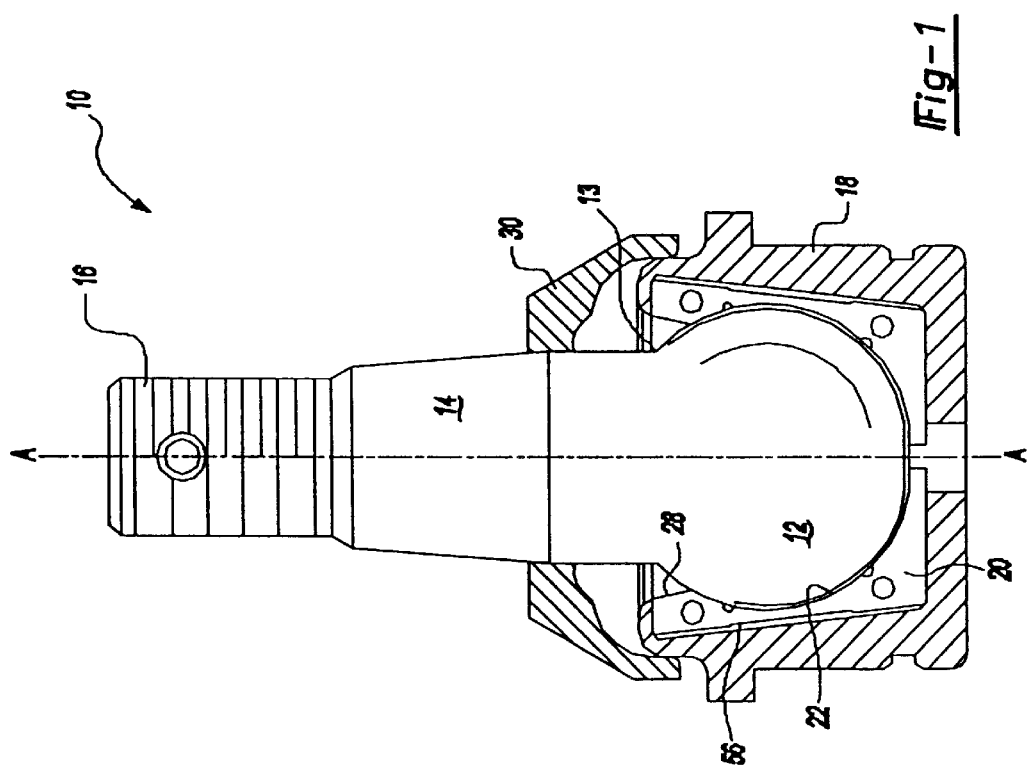
FIG. 1 is a cross-sectional side view of one embodiment of a ball and socket joint assembly that includes the improved the bearing socket liner of the present invention, wherein the stud of the joint assembly is shown in a centered position or at a zero angle of articulation.

Referring initially to FIGS. 1 and 2, a first embodiment of a ball joint assembly 10 may be described as follows. The assembly 10 includes a ball 12 integrally connected to a stud 14 at an interface 13. The ball 12 oscillates within a socket 22 secured fixedly within a housing 18. The housing 18 is adapted to be threadedly secured, in turn, to a mounting boss (not shown). The stud 14, on the other hand, is rigidly secured to a separate oscillating structure (also not shown), such as a tie rod arm that is relatively movable with respect to the mounting boss, by means of a threaded end 16 of the stud 14. The cup-shaped housing 18 is preferably formed on a metal material, such as steel or aluminum. The housing 18 includes and supports a soft material bearing socket liner 20 adapted to support the ball 12 for both oscillatory and angular articulation movements therein and in one embodiment a nylon composite plastic material. It will be noted that both the housing 18 and the liner 20 are tapered along an axis along which the stud 14 is shown in a non-articulated position, or one of zero articulation angle.

The liner 20 includes a socket interior 22 that is spherical in shape for supporting the spherical ball 12. In the first described embodiment, the liner 20 is formed of two longitudinally extending segments or subportions 20 as shown in FIG. 2. Although the invention calls for a plurality of at least two of such subportions 20, the first described embodiment employs just two subportions 20, although three or more may conceivably be supported within and about the circumference of the cup shaped housing 18 as circumferentially arranged segments 20.

The liner 20 includes a set of upper and lower lubrication grooves 24 and 26, respectively, which extend laterally or orthogonally to the axis A-A shared by the housing 18 and the liner 20. The liner incorporates a flared stud throat 28 for accommodating articulation movements of the stud 14. A boot or dust cover 30 protects the joint interface region 13 which otherwise provides a significant entry point for dirt, contaminants, and moisture.

Referring now particularly to FIG. 2, each liner subportion 20 incorporates a plurality of confronting faces that are arranged in co-acting relation with its next adjacent subportion about the interior circumference of the housing 18. Specifically, the confronting side faces 36 and 38, and the confronting bottom face 40, all have a plurality of bumps or protuberances 50 that act to assure spacing between the confronting faces of adjacent subportions 20. To the extent that the liner subportions 20 extend longitudinally, or parallel to the axis A-A, the collective parts of the liner 20 are more amenable to adjustment, hence more control of the balance between torque and stiffness can be designed into the assembly.

Figure 4:
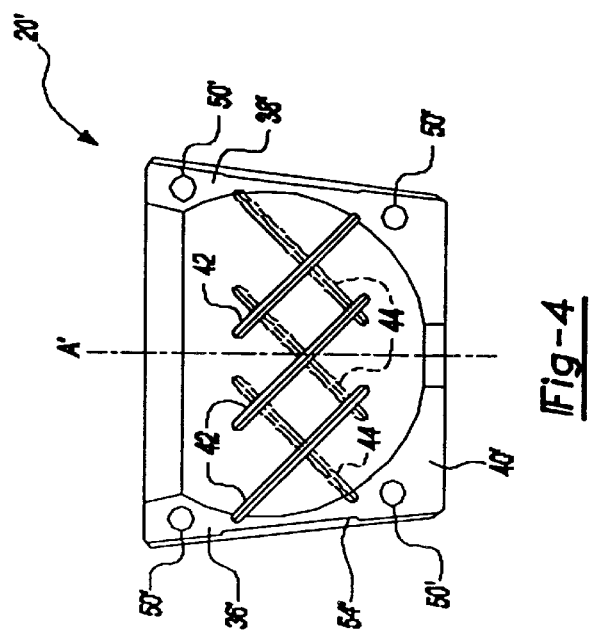
FIG. 4 is a cross-sectional side view of the second embodiment of the modified socket bearing liner, again shown separately and apart from the ball joint assembly.
Figure 3:
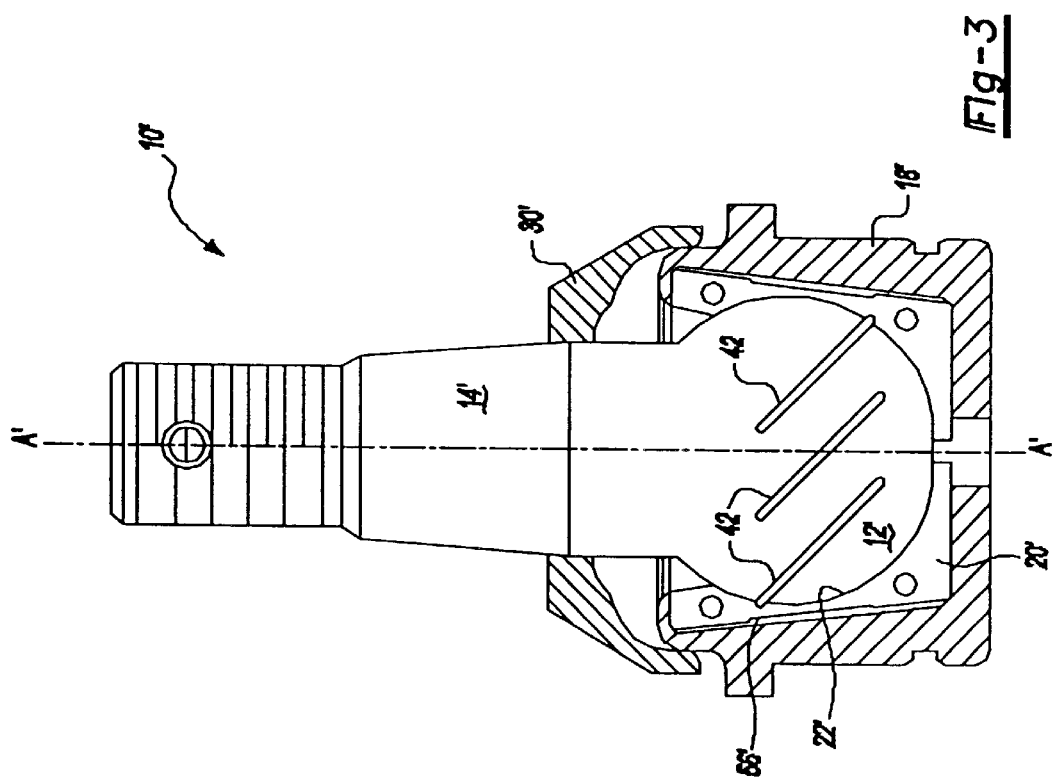
FIG. 3 is a cross-sectional side view of a second embodiment of a ball joint assembly that includes a modified bearing socket liner.

Referring now to FIGS. 3 and 4, a second described embodiment of the ball joint assembly 10' is presented, as shown. This embodiment is as the aforedescribed first embodiment in all respects except for the nature of the angular lubrication grooves 42 and 44. The grooves 42 are oriented in a first direction in one bearing socket liner half, while the grooves 44 are oriented in a second direction, orthogonally to the first, and the second bearing socket liner half, as shown. Other lubrication grooves embodiments are also within the scope of this invention, including elliptical FIG. 8 grooves, as well as other grooves having various inscribed patterns.

Figure 5:
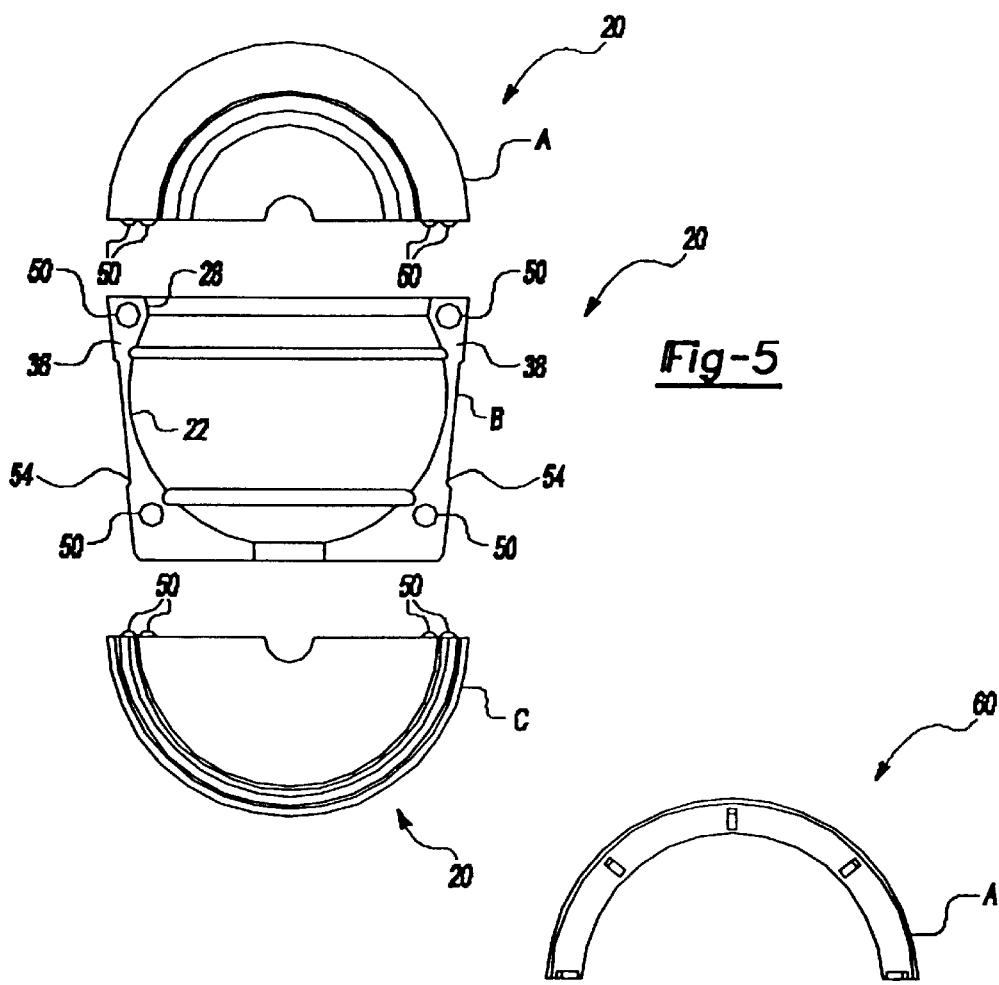
FIG. 5 is a composite of top, side, and bottom cross-sectional views of the first embodiment of the bearing socket liner, to show overall detail of the liner.

FIG. 5 is a composite view of one bearing liner subportion 20, shown in three views A, B, and C. The first, A, is a top view of the liner subportion 20 which reveals the protuberances 50 adapted to maintain a spaced apart relationship between the subportions upon assembly of the joint. It will be clear to those skill in the art that the pressures realized upon insertion of the ball 12 into the collective socket interior 22 of the liner subportions 20 will create great compressive pressures on the compliant material of the liner 20.

The protuberances 50 of this invention will assure that spacing between the subportions 20 is maintained, and that a gap will be defined between the confronting side faces of each subportion. The resultant gap will assure that additional lubrication channels are maintained within the joint structure, to thus enhance the useful life of the ball joint assembly 10. In the described first embodiment, the protuberances provided raised bumps having heights above the confronting surfaces 36, 38, and 40, of approximately 0.050 inch. It will be apparent to those skilled in the art that it is not necessary to have protuberances on each of the confronting surfaces, but rather to provide only one protuberance on any one of two matingly adjacent or confronting surfaces.

It will be noted that the center view B of the subportion 20 in FIG. 5 reveals a plurality of longitudinally extending slots 54 circumferentially disposed about the angularly tapered exterior walls of the subportion 20. The slots (also shown in FIGS. 2 and 4 as elements 54 and 54', respectively) correspond to interlocking ribs 56 (FIG. 1), 56' (FIG. 2) situated in the interior wall of the housing 18, 18' for purpose of securing the subportions 20, 20' against rotary movement within the housing 18, 18' during oscillatory movement of the ball 12, 12'. Such action would otherwise lead to unnecessary wear of the compliant liner material, with commensurate deleterious effect on the useful life of the joint assembly 10, 10'.

Figure 6:
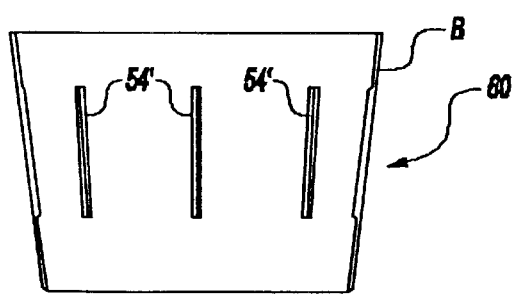
FIG. 6 is a composite of top side and bottom cross-sectional views of an alternate liner cover that can be used in yet a third embodiment of the invention.
Figure 6:
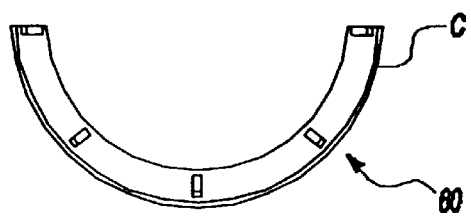

Finally, referring to FIG. 6, an alternate construction of the ball joint assembly 10 incorporates the use of soft exterior cover segments 60 and in one embodiment a soft compliant thermoplastic material, shown in three composite views A, B, and C, analogous to the views of FIG. 5. The cover segments 60 are adapted to circumferentially engage and or bond to the exterior surfaces of the subportions portions 20. Thus, in lieu of having the subportions 20 that physically include the slots 54, the subportions 20 can be manufactured without such slots, which can be provided by the slots 54' of separate exterior cover segments 60.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A ball and socket joint assembly comprising:
   a) a ball and stud integrally joined together, said ball disposed within a socket housing for limited oscillatory and angular articulation movements of the ball and stud with respect to said housing, said housing having a longitudinally extending axis and comprising a unitary cup-shaped body disposed about said axis, said socket housing further comprising a socket bearing liner disposed within the interior of said housing, said liner being formed of a non-metallic compliant material, wherein said liner is adapted to directly physically contact and support said ball for said movements; wherein
   b) said liner defines two longitudinally disposed half portions comprising semi-spherical interior surfaces adapted to engage exterior complementary semi-spherical surface portions of said ball, said half portions of said liner presenting longitudinally extending confronting surfaces disposed parallel to said axis of said housing, at least one of each of said confronting surfaces comprising a protuberance for spacing said confronting surfaces apart to form a longitudinally extending gap therebetween.

2. The ball and socket joint assembly of claim 1 further comprising a plurality of locking ribs disposed on the interior surface of said cup shaped interior body of said housing, wherein said locking ribs are oriented parallel to said axis of said housing, wherein said assembly further comprises corresponding longitudinally extending slots in said socket bearing liner half portions, and wherein said slots are provided in the outside diameter of said liner portions to directly engage said locking ribs.

3. The ball and socket joint assembly of claim 2 wherein the bearing socket liner further comprises lubrication grooves disposed circumferentially about the interior diameter of said liner.

4. The ball and socket joint assembly of claim 3, wherein said liner comprises a nylon composite plastic material.

5. The ball and socket joint assembly of claim 4 wherein each of said protuberances has a height dimension of approximately 0.050 inch, and wherein said protuberances are spaced apart on said one of said confronting side faces of said liner.

6. A ball and socket joint assembly comprising:
   a) a ball and stud integrally joined together, said ball disposed within a socket housing for limited oscillatory and angular articulation movements of the ball and stud with respect to said housing, said housing having a longitudinally extending axis and comprising a unitary cup-shaped body disposed about said axis, said socket housing further comprising a socket bearing liner disposed within the interior of said housing, said liner being formed of a non-metallic compliant material, wherein said liner is adapted to directly physically contact and support said ball for said movements; wherein b) said liner defines at least two longitudinally disposed circumferentially disposed subportions comprising spherically configured interior surfaces adapted to engage exterior complementary spherical surface portions of said ball, said subportions of said liner presenting longitudinally extending confronting surfaces disposed parallel to said axis of said housing, at least one of each of said confronting surfaces comprising a protuberance for spacing said confronting surfaces apart from its next adjacent subportion to form a longitudinally extending gap therebetween; and c) a plurality of locking ribs disposed on the interior surface of said cup shaped interior body of said housing, wherein said locking ribs are oriented parallel to said axis of said housing, wherein said assembly further comprises corresponding longitudinally extending slots in said socket bearing liner subportions, and wherein said slots are provided in the outside diameter of said liner subportions, said slots being adapted to be directly engaged by said locking ribs.

7. The ball and socket joint assembly of claim 6, wherein said liner comprises a nylon composite plastic material.

8. The ball and socket joint assembly of claim 7 further comprising a plurality of lubrication grooves disposed circumferentially about the interior diameter of said liner.

9. A ball and socket joint assembly comprising:

a) a ball and stud integrally joined together, said ball disposed within a socket housing for limited oscillatory and angular articulation movements of the ball and stud with respect to said housing, said housing having a longitudinally extending axis and comprising a unitary cup-shaped body disposed about said axis, said socket housing further comprising a socket bearing liner disposed within the interior of said housing, said liner being formed of a non-metallic compliant material, wherein said liner is adapted to directly physically contact and support said ball for said movements; wherein b) said liner defines at least two longitudinally disposed circumferentially disposed subportions comprising spherically configured interior surfaces adapted to engage exterior complementary spherical surface portions of said ball, said subportions of said liner presenting longitudinally extending confronting surfaces disposed parallel to said axis of said housing, at least one of each of said confronting surfaces comprising a protuberance for spacing said confronting surfaces apart from its next adjacent subportion to form a longitudinally extending gap therebetween; and c) each of said socket bearing liner subportions having a cover portion bonded to the exterior thereof, each exterior of said cover portion comprising a plurality of longitudinally extending slots oriented parallel to said axis of said housing; and d) a plurality of locking ribs disposed on the interior surface of said cup shaped interior body of said housing, wherein said locking ribs are also oriented parallel to said axis of said housing, and wherein said longitudinally extending slots in said exterior cover portion of each of said socket bearing liner subportions are adapted to be directly engaged by said locking ribs.

10. The ball and socket joint assembly of claim 9 wherein said cover portions comprising a soft compliant thermoplastic material.

* * * * *